United States Patent [19]
Löffelholz et al.

[11] Patent Number: 6,136,062
[45] Date of Patent: Oct. 24, 2000

[54] NIOBIUM POWDER AND A PROCESS FOR THE PRODUCTION OF NIOBIUM AND/OR TANTALUM POWDERS

[75] Inventors: Josua Löffelholz, Langelsheim; Frank Behrens, Goslar, both of Germany

[73] Assignee: H. C. Starck GmbH & Co. KG, Goslar, Germany

[21] Appl. No.: 09/400,399

[22] Filed: Sep. 21, 1999

[51] Int. Cl.⁷ .................................................. B22F 1/00
[52] U.S. Cl. .................. 75/369; 75/622; 75/228; 75/368
[58] Field of Search ............... 75/369, 622, 228, 75/368

[56] References Cited

U.S. PATENT DOCUMENTS

| | | |
|---|---|---|
| 1,728,941 | 9/1929 | Rich et al. . |
| 2,516,863 | 8/1950 | Gardner ........................ 75/94 |
| 3,647,420 | 3/1972 | Restelli . |
| 4,684,399 | 8/1987 | Bergman et al. ................ 75/0.5 BB |
| 4,687,632 | 8/1987 | Hurd et al. ..................... 419/45 |
| 4,722,756 | 2/1988 | Hard . |

FOREIGN PATENT DOCUMENTS

| | | |
|---|---|---|
| 489742 | 3/1937 | United Kingdom . |
| WO95/32313 | 11/1995 | WIPO . |
| WO98/19811 | 5/1998 | WIPO . |
| WO98/37248 | 8/1998 | WIPO . |

*Primary Examiner*—Ngoclan Mai
*Attorney, Agent, or Firm*—Perkins, Smith & Cohen; Jerry Cohen

[57] ABSTRACT

The process comprises the reduction of niobium and/or tantalum oxides by means of alkaline earth metals and/or rare earth metals, wherein the first reduction stage is carried out as far as an average composition corresponding to (Nb, Ta)$O_x$ where x=0.5 to 1.5 and before the second stage the reduction product from the first stage is freed from alkaline earth oxides and/or rare earth metal oxides which are formed (and optionally from excess alkaline earth metal and/or rare earth metal) by washing with mineral acids.

11 Claims, 1 Drawing Sheet

NIOBIUM POWDER AND A PROCESS FOR THE PRODUCTION OF NIOBIUM AND/OR TANTALUM POWDERS

FIELD AND BACKGROUND OF THE INVENTION

The present invention relates to a niobium powder which is suitable for producing capacitors, and to a process for producing niobium powder by the reduction of niobium oxides by means of alkaline earth metals and/or rare earth metals.

The reduction of heavy metal oxides by alkaline earth metals or hydrides is basically known; see U.S. Pat. No. 1,728,941, U.S. Pat. No. 2,516,863 and U.S. Pat. No. 4,687,632 for example. One problem is that the reduction proceeds strongly exothermically. After igniting a mixture of the oxide to be reduced and the reducing agent, the reaction proceeds substantially uncontrollably over a very short period of time, and the reaction mixture is heated to temperatures far in excess of 1000° C. Reactions of this type can only be controlled with difficulty, due to the high pressure which builds up in the manner of an explosion, the need to dissipate the heat of reaction and the demands made on the reactor material. In particular, and among other problems, irreproducible grades of product with uncontrollable grain sizes are obtained. No success has hitherto been achieved in using this reaction for producing high purity acidic earth metal powders for use in capacitors.

SUMMARY OF THE INVENTION

The present invention comprises a process for producing niobium and/or tantalum powders by the reduction of corresponding niobium and/or tantalum oxides by means of alkaline earth metals and/or rare earth metals, which is characterized in that the reduction is carried out in two stages at a controlled temperature, wherein the first reaction stage is conducted as far as an average composition corresponding to $(Nb, Ta)O_x$ where x=0.5 to 1.5 and before the second stage the reduction product from the first stage is freed from alkaline earth oxides and/or rare earth metal oxides which are formed and optionally from excess alkaline earth metal and/or rare earth metal by washing by means of mineral acids.

In the first reduction stage, a melt of the alkaline earth metal and/or rare earth metal is preferably placed in a vessel and the oxide is gradually metered into the melt in such a way that the temperature of the first reduction stage does not fall below 750° C. and does not exceed 950° C. Metering is most preferably effected in such a way that the temperature does not vary by more than 50° C. from a preselected temperature within the afore mentioned range. This preselected temperature is most preferably between 750 and 850° C.

The oxides which can be reduced are $Nb_2O_5$, $NbO_2$ and/or $Ta_2O_5$ $Nb_2O_5$ is particularly preferred.

The preferred reducing metals according to the invention are magnesium, calcium, lanthanum and cerium. Magnesium is particularly preferred.

Although the reduction of acidic earth metal powders by means of alkaline earth and/or rare earth metals can in principle be conducted as far as the acidic earth metal stage if higher temperatures are permissible, it has been found that at the controlled low temperatures according to the invention the reduction is apparently impeded by alkaline earth and/or rare earth metal oxides which are formed, so that the acidic earth metal stage is not reached until the oxides formed have been removed.

In order to ensure a reduction which is as extensive as possible, even in the first stage, the oxide is metered into the reducing agent melt in a sub-stoichiometric amount with respect to the reduction reaction.

To prevent local overheating effects in the melt, the latter is preferably stirred. In particular, during the preferred use of magnesium as the reducing agent, local overheating of the melt above the boiling point of magnesium, even for short periods, has to be prevented.

In order to dissipate the heat of reaction, it is necessary to provide adequate cooling via the surface of the reactor in which the melt is placed in order to ensure a satisfactory, industrially useful rate of addition of the oxide. On the other hand, the cooling which is provided via the surface must not result in a reduction of the temperature of the reactor wall below the melting temperature of the reducing agent. For example, the melting temperature of magnesium is 650° C., that of cerium is 797° C., that of calcium is 850° C. and that of lanthanum is 920° C. Therefore, care has to be taken that the dissipation of heat per unit area of the vessel surface is not too great.

If a liquid cooling medium is used, the temperature difference between the cooling medium and the reduction temperature should preferably be between 50 and 100 K. If a gaseous cooling medium is used, the cooling capacity can be controlled solely via the amount of gas supplied, due to the low heat capacity of the gas.

If a cooling medium is used which has too high a cooling capacity, the cooling capacity can be controlled by correspondingly insulating the reduction vessel.

Cooling is preferably effected so that for the metered addition of each kg/hour of niobium pentoxide a cooling surface area of 0.01 to 0.1 $m^2$, preferably 0.02 to 0.08 $m^2$, is in contact with the melt. In this situation it is possible to control the cooling capacity so that a sufficiently uniform temperature prevails in the stirred melt.

The reduction is preferably conducted under an inert gas, i.e. in an atmosphere which is free from oxygen and carbon in particular. Nitrogen, or noble gases such as argon, are suitable as inert gases according to the invention.

On account of the gradual continuous or batch-wise addition of the niobium pentoxide to the melt of the reducing agent, a uniform dwell time cannot be ensured. In order to complete the reaction and to ensure a minimum dwell time of 15 minutes, the reduction product is subsequently heated for a further 15 to 180 minutes, preferably for 15 to 30 minutes, at 750 to 900° C.

Thereafter, the reduction product is cooled to a temperature below 100° C. and is deactivated by gradual contact with an oxygen-containing atmosphere. The oxides formed from the reducing agent, and the reducing agent which is present in excess over the stoichiometric amount, are subsequently separated from the $NbO_x$ powder by washing with acids. The acid which is preferably used is sulfuric acid, particularly sulfuric acid with a pH <1.5. Washing with acid and washing with water can be carried out alternately and repeatedly, until magnesium can no longer be detected in the acid. The final washing-off of the acid from the $NbO_x$ powder is effected until sulfuric acid can no longer be detected in the water.

The $NbO_x$ powder which is obtained occurs in the form of agglomerated primary particles.

The primary particle size is essentially determined by the particle size of the oxide starting material, taking into account the reduction in volume due to the removal of oxygen and the change in crystal structure.

The particle size of the oxide starting material is selected according to the desired primary particle size. The aim is to achieve a primary particle size of 0.1 to 1 $\mu$m for the acidic earth metal powder which can be obtained after the second reduction stage, by corresponding grinding and sieving of the oxide starting material.

The first reduction stage according to the invention can be conducted as a batch operation. For this purpose, the reducing agent is placed in a container (which is preferably lined with tantalum sheet and which comprises a stirrer made of niobium or tantalum) and is heated to the reduction temperature, the stirrer is set in operation, and the niobium pentoxide is subsequently added in small doses to the melt. In the interest of achieving a reduction which is extensive as possible, the stoichiometric excess of reducing agent should be at least 10% with respect to the total amount of added pentoxide. In the interest of being able to stir the contents of the reduction reactor, a 25 to 400% excess of reducing agent is preferably employed. The stoichiometric excess of reducing agent should most preferably be 50 to 200%. The excess of reducing agent may also be replaced in part by inert diluent salts which are liquid at the reduction temperature, such as sodium or potassium chloride or fluoride.

For a given batch size, the size and size distribution of the agglomerates of the reduction product of this first stage, and thus the size and size distribution of the metal powder obtained after the second stage also, can be controlled by the choice of the stoichiometric excess and optionally of the amount of diluent salt, as well as the stirring speed. A larger stoichiometric excess of the reducing metal and a larger amount of diluent salt result in smaller agglomerates, as does a higher stirring speed.

For use in capacitors, agglomerates are preferred which have a $D_{50}$ value as measured by Mastersizer of 50 to 300 $\mu$m, wherein the $D_{90}$ value can be 1.8 to 2.5 times the $D_{50}$ value.

The dimensions of the agglomerates can be corrected by grinding operations, or can be corrected in the second reduction stage (enlargement of agglomerates).

Other objects, features and advantages will be apparent from the following detailed description of preferred embodiments taken in conjunction with the accompanying drawing in which:

DETAILED DESCRIPTION OF PREFERRED EMBODIMENTS

Figure 1:
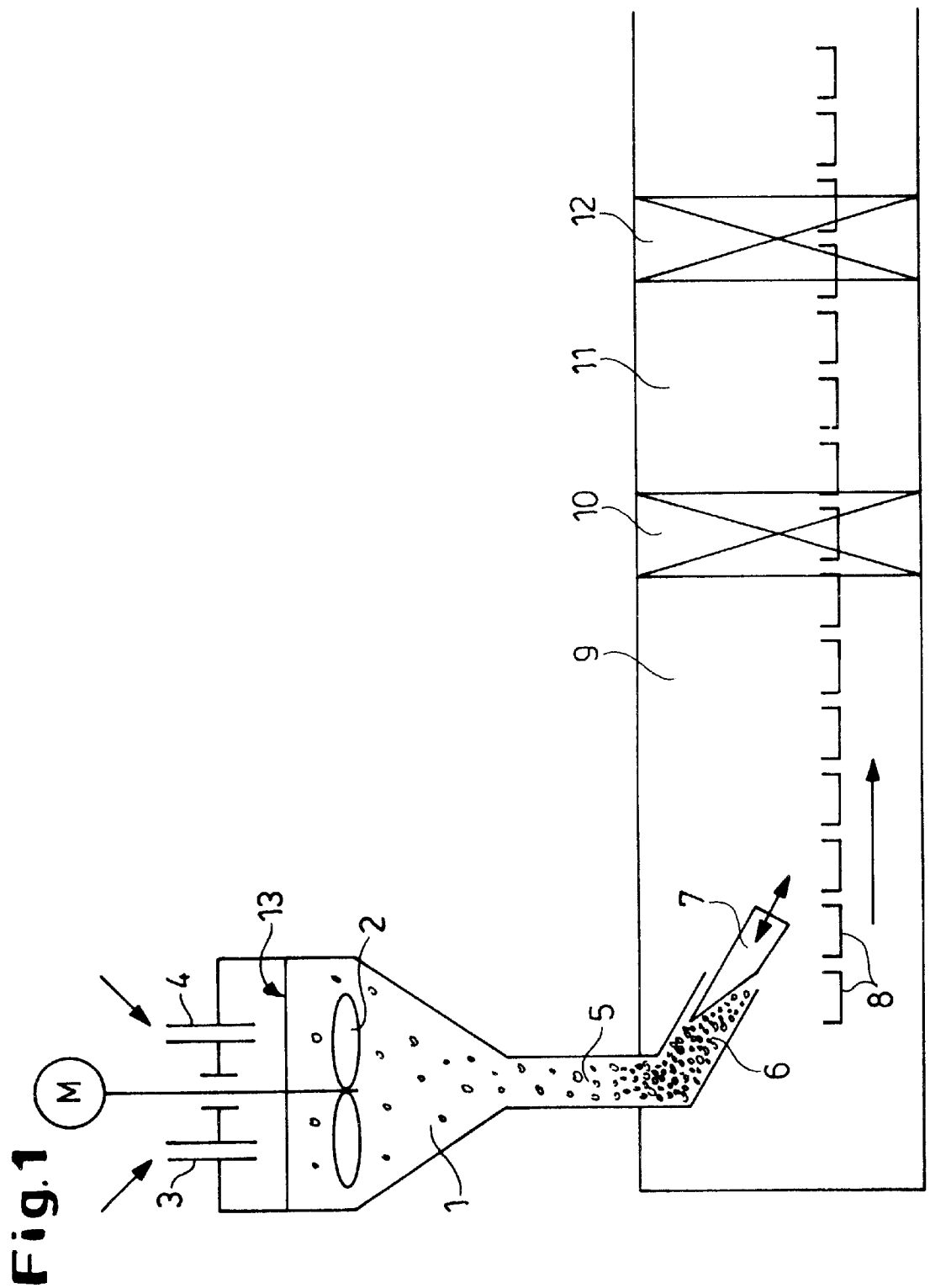
FIG. 1 is a schematic layout of apparatus for practice of a preferred embodiment of the process of the invention.

FIG. 1 shows a conical reactor vessel 1 with a motor (M) driven stirrer 2, feed parts 3, 4 for reducing agent and oxide charge components. A further inlet (not shown) is used to supply protective gas. The charge is heated to melting stage (for the reducing agent) and the (Ta, Nb) oxide is converted to target metal particles which pass through exit tube 5 having an angled outlet section 6 exiting through a channel feed stopper 7 to small trays 8 on a conveyor or belt (not shown) for transport through chambers 9, 11 and beyond passing interlock valves 10, 12 to control inert atmosphere and eventual air release for cool down of the newly formed particles.

According to a preferred embodiment of the process, the first reduction stage is carried out continuously. In this procedure, the melt of the reducing agent is placed in a conical container, and the pentoxide and the reducing agent are continuously added to the melt, simultaneously or alternately, via the above mentioned parts 3, 4. Due to their higher densities, the $NbO_x$ formed and the alkaline earth oxide settle out in the conical tip of the reactor and can be taken off continuously or discontinuously therefrom. Depending on the compaction in the conical tip of the $NbO_x$/MgO powder which is formed by reduction, molten magnesium which is present between the particles is also removed in an amount of 25 to 45% of the volume of $NbO_x$/MgO powder. Accordingly, magnesium is correspondingly added in stoichiometric excess.

High-purity niobium pentoxide and reducing agent are preferably used as the starting materials for the process according to the invention. The most preferred niobium powders which are suitable for the production of capacitors are obtained when niobium pentoxide with a total content of extraneous metal of less than 150 ppm is used. Most preferably, none of the impurity metals should be present in an amount of more than 10 ppm. Higher contents of the metal used as the reducing agent, or of tantalum, do not cause problems. In general, nonmetallic impurities are substantially removed during reduction. According to the invention, mixed niobium/tantalum oxides which result from the incomplete separation of these two metals can also be used. However, it is essential that the carbon content of the oxides is low. Oxides with carbon contents less than 50 ppm, most preferably less than 10 ppm, are preferably used.

The reducing agent is also used in as pure a form as possible. The requirements here are less stringent, however, since it has been observed that individual metallic impurities less than 50 ppm are not incorporated in the $NbO_x$ or niobium metal, or are only incorporated to a very slight extent.

Cooling and washing with acid is followed by the reduction of the $NbO_x$ to the metal. This can be effected in any desired manner. The $NbO_x$ powder is preferably treated with an amount of magnesium turnings which is greater than stoichiometric with respect to the residual oxygen content, and is heated for a period of 1 to 4 hours, preferably about 2 hours, under a protective gas at a temperature of 750 to 960° C., preferably at about 850° C.

The batch is subsequently cooled to less than 100° C., oxygen is gradually admitted in order to deactivate it, and acid washing is repeated as in the first reduction stage.

The enlargement of the agglomerates can be controlled by the choice of temperature and dwell time in the second reduction stage.

The second reduction stage can be effected either batchwise, or continuously in a sliding batt kiln.

Niobium powders which are intended for use in electrolytic capacitors are preferably doped with at least one of the elements nitrogen, phosphorus, boron or sulphur. Doping with nitrogen can be effected up to 20,000 ppm, doping with phosphorus can be effected up to 1,000 ppm, doping with boron can be effected up to 1,500 ppm and doping with sulphur can be effected up to 100 ppm. Doping with nitrogen is preferably effected to give a content of at least 500 ppm and doping with phosphorus is preferably effected to give a content of at least 50 ppm. Doping is preferably effected by impregnating the niobium powder with what is preferably an aqueous solution of a compound which contains the dopant element, the solvent is removed by drying, and the dopant element is subsequently incorporated by diffusion under reducing conditions at temperatures of 750 to 960° C., preferably about 850° C., over a period of 1 to 4 hours. For this purpose, magnesium turnings are mixed with the impregnated, dried powder in an amount which is 1.1 to 2.2 times the stoichiometric amount with respect to the surface-bonded oxygen of the powder, and the batch is heated to the inward diffusion temperature under an inert gas, preferably argon. The batch is subsequently cooled below 100° C. again under a protective gas and is passivated again by gradually admitting oxygen.

Suitable compounds for doping include phosphorus or phosphorus compounds such as ammonium phosphate, ammonium hydrogen phosphate or phosphoric acids.

The magnesium oxide which is formed during the reductive inward diffusion of the dopant elements, together with magnesium if necessary, are subsequently washed again with a mineral acid, particularly sulphuric acid, optionally with the addition of hydrogen peroxide. The product is then washed free from adhering acid with water until the wash water is neutral, and is dried at a moderate temperature.

The doping operation is optionally repeated to achieve higher levels of doping.

According to a further preferred embodiment of the invention, the treatment or the additional treatment with dopants can be effected before the second reduction stage, so that inward diffusion of the dopant substances occurs during the second reduction.

The powder can be sieved to minus 400 $\mu$m, preferably minus 300 $\mu$m.

Pursuant to the present invention, also niobium powder agglomerates are produced with a primary grain size of 0.1 to 1 $\mu$m diameter and an agglomerate diameter distribution corresponding to a D50 of 100 to 300 $\mu$m as measured by Mastersizer. Agglomerate diameter distributions which are particularly preferred additionally have a D10 value of 20 to 70 $\mu$m and a D90 diameter of 250 to 400 $\mu$m as measured by Mastersizer. The BET specific surface preferably falls within the range from 2 to 15 $m^2/g$. After production on a laboratory scale, the powders according to the invention have a total content of extraneous metals (with the exception of magnesium and tantalum) of less than 300 ppm. It appears that, when produced on an industrial scale, the content of extraneous metals may be reduced even further, so that it is anticipated that powders produced by the process according to the invention on an industrial scale would have a total content of extraneous metals of less than 150 ppm. The carbon content of the powders is similarly about 200 ppm when produced on a laboratory scale, due to contamination. When production is effected on an industrial scale, it should also be possible significantly to reduce the contamination by carbon.

The comparatively high magnesium content, which can vary between 800 and 10,000 ppm, is determined by the process. Most powders have magnesium contents less than 5,000 ppm, however.

The tantalum contents between 1,000 and 12,000 ppm which result from the use of reactors lined with tantalum are not harmful.

The oxygen content falls within the range which is desirable for capacitor applications, namely from 2,000 to 5,000 ppm per $m^2/g$ of BET specific surface.

After sintering the niobium powder agglomerates according to the invention at 1,150° C. for 20 minutes to give a sintered density of about 5 $g/cm^3$ and forming at 40 volts it is possible to achieve capacitor capacitances of 70,000 to 380,000 $\mu$FV/g with a leakage current density of 0.5 to 1.5 nA/$\mu$FV (electrolyte: 18% sulphuric acid). Under the same sintering conditions, electrodes are obtained which, after forming at 16 volts exhibit a capacitor capacitance of 120,000 to 250 000 $\mu$FV/g and a leakage current density of 0.7 to 2 nA/$\mu$FV.

The invention is explained in greater detail with reference to the following non limiting examples:

EXAMPLES 1 TO 6

A cylindrical stainless steel vessel was used which was lined internally with tantalum sheet, and which had an inside diameter of 145 mm and an internal volume of 5 liters.

A stirrer made of tantalum was passed centrally through the cover of the vessel. Moreover, connections were provided for the supply and discharge inert gas, for the addition of powdered material via a rotating lock, and for the introduction of a thermocouple.

The cylindrical vessel was inserted, with its cover sealed (retort), in a thermostatted device which was open at the top and which was fitted with a electric heater and with cooling devices.

After the supply lines had been connected, the retort was flushed with argon. The amount of Mg turnings given in Table 1 was introduced through the rotary lock, and the batch was heated to the reduction temperature (Table 1). As soon as the magnesium had melted the stirrer was set in operation. After the reduction temperature had been exceeded by 10 K, the heater was switched off. When the temperature had fallen to 20° C. below the reduction temperature, about 10 g of $Nb_2O_5$ powder were added. The temperature in the retort rose to 10 to 25 K above the reduction temperature. When the temperature had fallen again, $Nb_2O_5$ was added again. This procedure was repeated until the total amount of $Nb_2O_5$ give in Table 1 had been added. The batch as stirred for a further 20 minutes after the addition was complete.

The batch was then cooled to room temperature (<100° C.). Flushing with argon was then discontinued so that air could gradually enter.

The reaction product was removed, washed alternately with dilute sulphuric acid and water, and was subsequently dried.

The dried material was sieved to 400 µm. The analysis results given in Table 1 were obtained for the $NbO_x$ produced.

TABLE 1

| | Example | | | | | |
|---|---|---|---|---|---|---|
| | 1 | 2 | 3 | 4 | 5 | 6 |
| Mg turnings (g) | 480 | 400 | 342 | 570 | 342 | 342 |
| Red.-Temp. (° C.) | 890 | 750 | 750 | 750 | 750 | 750 |
| $Nb_2O_5$ | 350 | 350 | 600 | 1000 | 600 | 300 |
| $NbO_x$: x | 1.44 | 0.97 | 0.65 | 1.28 | 0.98 | 0.74 |
| $FSSS^{1)}$ (µm) | 2.13 | 1.19 | 1.59 | 0.39 | 0.70 | 0.5 |
| $SG^{2)}$ (g/inch³) | 16.0 | 11.9 | 17.0 | 12.4 | 18.7 | 14.3 |
| $BET^{3)}$ (m²/g) | 32.4 | 50.1 | 24.5 | 59.9 | 8.0 | 18.49 |
| Mastersizer$^{4)}$ (µm) | | | | | | |
| $D_{10}$ | 34.4 | 62.9 | 40.5 | 4.1 | 3.16 | 10.7 |
| $D_{50}$ | 138.5 | 301.3 | 202.0 | 108.7 | 175.16 | 198.7 |
| $D_{90}$ | 270.8 | 567.8 | 438.2 | 333.3 | 407.1 | 427.8 |
| Analysis (ppm): | | | | | | |
| C | 120 | 203 | 206 | 208 | 129 | 116 |
| MgO | 9300 | 1660 | 18250 | 55600 | 42800 | 116 |
| Ta | n.d. | 11,200 | 1180 | 7690 | 1500 | 1600 |
| Other metals (total) | <200 | <200 | <200 | <200 | <200 | <500 |

[1] particle size determined by Fisher Sub Sieve Sizer (FSSS)
[2] bulk density
[3] BET specific surface
[4] particle size distribution determined by Mastersizer
[5] determined visually from SEM photographs Each 100 g of the $NbO_x$ obtained were treated with elemental phosphorus or $NH_4Cl$ in the amounts given in Table 2 and were subsequently reduced to niobium metal in the second reduction stage under the conditions given in Table 2.

After cooling, deactivation and washing with acid, the batch was doped again ($2^{nd}$ doping). The batch was again removed, deactivated, washed with acid and dried.

Test electrodes were produced from the niobium powders obtained, by pressing and sintering them round a tantalum wire.

The electrodes were formed in a solution of 0.25% $H_3PO_4$ at 60° C. and their properties as capacitors were determined in an 18% $H_2SO_4$ electrolyte at room temperature.

The production conditions and capacitor properties of the anodes are presented in Table 3.

TABLE 2

| | Example | | | | | |
|---|---|---|---|---|---|---|
| | 1 | 2 | 3 | 4 | 5 | 6 |
| 1. Doping (ppm) | | | | | | |
| P | 150 | 150 | 150 | 150 | 150 | 150 |
| $NH_4Cl$ | | 10,000 | | | | |
| 2. Reduction | | | | | | |
| Mg turnings; (g) | 50 | 30 | 30 | 40 | 30 | 30 |
| Temperature (° C.) | 800 | 800 | 800 | 800 | 800 | 800 |
| Duration (hours) | 2 | 2 | 2 | 2 | 2 | 2 |
| 3. Doping (ppm P) | 50 | 50 | 50 | 50 | 50 | 50 |
| Mg turnings | 5 | 5 | 5 | 5 | 5 | 5 |
| Temperature | 800 | 800 | 800 | 800 | 800 | 800 |
| Analysis | | | | | | |
| BET m²/g | 3.53 | 2.03 | 4 | 1.56 | 5.24 | 7.86 |
| Mg ppm | n.d. | 3500 | 1300 | 2200 | 8800 | 7100 |
| O ppm | 56,000 | 14,500 | 20,000 | 15,000 | 30,000 | 45,000 |
| N ppm | n.d. | >30,000 | n.d. | n.d. | n.d. | n.d. |

TABLE 3

| | Example | | | | | | | |
|---|---|---|---|---|---|---|---|---|
| | 1 | 2 | 3a | 3b | 4 | 5 | 6a | 6b |
| Nb powder from Example | 1 | 2 | 3 | 3 | 4 | 5 | 5 + 6 | 6 |
| Sintering conditions | | | | | | | | |
| Sintered density g/cm³ | 3.39 | 3.65 | 5 | 5 | 3.5 | 3.7 | 3.18 | 3.6 |
| Temperature ° C. | 1300 | 1250 | 1250 | 1250 | 1150 | 1150 | 1150 | 1150 |
| Duration min | 10 | 30 | 20 | 20 | 20 | 20 | 20 | 20 |
| Forming voltage V | 40 | 16 | 40 | 16 | 40 | 16 | 40 | 16 |
| Spec. capacitance µFV/g | 127,02 | 40,518 | 23,043 | 29,725 | 74,622 | 213,804 | 357,664 | 356,521 |
| Spec. leakage current µA/µFV | 6.67 | 1.6 | 2.01 | 2.7 | 4.7 | 0.85 | 0.78 | 1.62 |

EXAMPLE 7

Continuous process:

An installation is used which is illustrated schematically in the accompanying FIG. 1 as described above. The size of the outlet opening is regulated by displacing the chamfered stopper 7 in the direction of the arrow, so that the amount of suspension emerging from the reactor can be regulated. Catchment pans 8 are located below the outlet tube 6 on a conveyor belt which can be moved in the direction of the arrow. The space 9 in which the outlet 6 is located is filled with a protective gas. While the pans are conveyed through the space 9 they are cooled to a temperature below 100° C. Thereafter they pass through the lock 10. The passivation space 11 is filled with a protective gas containing 1 to 2% oxygen. After passing through the further lock 12, the pans enter the atmosphere. An industrial installation comprises a conical vessel 1 with a volume of 12 liters, for example. The vessel surface in contact with the magnesium melt (level 13) has an area of 0.4 m$^2$. It is cooled by ambient air. 6.1 kg/hour of niobium pentoxide and 4.25 kg/hour of magnesium are continuously fed in. The niobium pentoxide powder is reduced in vessel 1 and descends under the force of gravity into tube 5, which has a diameter of 6 cm and a length of 30 cm, with the displacement of magnesium melt. 10.45 kg/hour of reduction product are discharged into pans 8 at outlet 6. After cooling, deactivation and acid-washing, 130 kg NbO$_x$ are produced per day.

What is claimed is:

1. A process for producing niobium and/or tantalum powders by the reduction of their corresponding niobium and/or tantalum oxides, wherein the reduction is carried out in two stages using a reducing agent selected from the group consisting of alkaline earth metals and rare earth metals, the process comprising:

conducting the first reduction stage using said reducing agent until an average composition corresponding to (Nb,Ta)O$_x$ where x=0.5 to 1.5 is reached, washing the reduction product from the first reduction stage with one or more mineral acids to remove oxides of the reducing agent, and then conducting the second reducing stage with said reducing agent to produce powder of the metal.

2. A process according to claim 1, wherein between the first and second stages the reduction product is also freed of excess reducing agent.

3. A process according to either of claims 1 or 2, wherein in the first reduction stage the melt of the reducing agent metal is placed in a reaction vessel in at least a 1.25-fold excess with respect to the oxygen content of the niobium and/or tantalum oxide and the oxide is gradually metered into the melt in such a way that the reduction reaction exotherm-affected temperature of the first reduction stages does not fall below 750° C. and does not exceed 950° C.

4. A process according to claim 3, wherein the melt is stirred during the metered addition of the oxide.

5. A process according to claim 4, wherein the first reduction stage is conducted continuously by the simultaneous or alternating metered addition of oxide and reducing metal into a melt of the reducing metal placed in a vessel with continuous or batch-wise discharge of the reduction product.

6. A process according to either of claims 1 or 2, wherein following the first reduction stage and/or the second reduction stage the reduction product which is obtained is treated with dopant substances containing P, B, S, and/or N.

7. A process according to either of claims 1 or 2, wherein the production of niobium powder Nb$_2$O$_5$ is used as the niobium oxide and magnesium is used as the reducing metal.

8. Niobium powder agglomerates with a primary grain size of diameter 0.1 to 1 µm and an agglomerate diameter distribution corresponding to a D50 of 100 to 300 pm as determined by Mastersizer.

9. Niobium powder agglomerates according to claim 8 with a BET specific surface of 2 to 15 m$^2$/g.

10. Niobium powder agglomerates according either of claims 8 or 9 of a physical and electrical property set such that after sintering at 1,150° C. for 20 minutes and forming at 40 volts the sintered products of such agglomerates exhibit a capacitance of 70,000 to 360,000 µFV/g and a leakage current density of 0.5 to 1.5 nA/µFV.

11. Niobium powder agglomerates according to either of claims 8 or 9 of a physical and electrical property set such that after sintering at 1,150° C. for 20 minutes and forming at 16 volts the sintered products of such agglomerates exhibit a capacitance of 120,000 to 380,000 µFV/g and a leakage current density of 0.7 to 2 µA/µFV.

* * * * *